United States Patent
Tomiyama et al.

[11] Patent Number: 5,805,360
[45] Date of Patent: Sep. 8, 1998

[54] OBJECTIVE LENS DRIVE DEVICE

[75] Inventors: Takamichi Tomiyama; Koji Mitsumori; Keiichi Shibata, all of Chiba, Japan

[73] Assignee: Sony Corporation, Tokyo, Japan

[21] Appl. No.: 666,989

[22] Filed: Jun. 19, 1996

[30] Foreign Application Priority Data

Jun. 28, 1995 [JP] Japan .................................. 7-161650

[51] Int. Cl.$^6$ ...................................................... G02B 7/02
[52] U.S. Cl. ......................... 359/813; 359/814; 359/824
[58] Field of Search .................................. 359/813, 814, 359/823, 824; 369/44.15, 44.16

[56] References Cited

U.S. PATENT DOCUMENTS

| | | | |
|---|---|---|---|
| 4,462,096 | 7/1984 | Kusaka | 369/45 |
| 4,646,283 | 2/1987 | Ito et al. | 369/256 |
| 4,794,580 | 12/1988 | Ikedo et al. | 369/44 |
| 4,927,235 | 5/1990 | Narumi | 359/824 |
| 5,018,836 | 5/1991 | Noda et al. | 359/824 |
| 5,161,067 | 11/1992 | Tomiyama et al. | 359/824 |
| 5,199,014 | 3/1993 | Homburg et al. | 369/44.15 |

*Primary Examiner*—David C. Nelms
*Assistant Examiner*—Ricky Mack
*Attorney, Agent, or Firm*—Ronald P. Kananen

[57] ABSTRACT

An objective lens drive device that can be assembled with a high production efficiency, without any adhesives being forced out. The objective lens drive device is in the form of a bi-axial actuator having empty chambers 25a, 25b formed by a portion of a bobbin holder 15, a portion of a lens holder 2, and a portion of a coil bobbin 4. The empty chambers 25a, 25b are filled with an adhesive 3 to bond the coil bobbin 4 to the lens holder 2. Thus, no adhesives are forced out, and the adhesive can be cured within a short time.

11 Claims, 3 Drawing Sheets

OBJECTIVE LENS DRIVE DEVICE

BACKGROUND OF THE INVENTION

1. Field of the Invention

The present invention relates generally to optical pickups used for recording and/or reproducing information signals and, in particular, to an objective lens drive device for an optical pickup, which is used in recording and reproducing information signals on an information recording medium.

2. Description of the Related Art

A conventional biaxial actuator has been used for an optical pickup, which is used in recording and reproducing information signals on an information recording medium such as an optical disk. The actuator is constructed so that an objective lens mounted on a supporting member is movable in both a focusing direction and a tracking direction.

Such an actuator is constructed, for example, as illustrated in FIGS. 3(a) and 3(b). More specifically, referring to FIGS. 3(a) and 3(b), the biaxial actuator 1 includes a lens holder 2 for holding an objective lens 11, and a coil bobbin 4 affixed to the lens holder 2 with an adhesive 3 or the like.

The lens holder 2 is supported by leaf springs 8, each of which has one end affixed to a stationary mounting section 5. The lens holder 2 is movable along two dimensions with respect to the information recording medium. Specifically, the lens holder 2 is movable along the tracking directions indicated by the double-headed arrow A (FIG. 3(a)) and along the focusing directions indicated by the double-headed arrow B (FIG. 3(b)). The coil bobbin 4 has a focusing coil 6 and tracking coils 7 wound thereon to provide such movement.

A yoke 9 is formed at the upper face of a substrate on which the mounting section 5 is mounted. The yoke 9 is made of a magnetic substance, and is formed into a U-shaped cross section at the lower portion of the biaxial actuator 1. A permanent magnet 10 is affixed to an inner side of the yoke 9. One of the pieces of the yoke 9 is inserted into a hole in the center of the coil bobbin 4, and the other piece is inserted into a yoke inserting hole 9a in the lens holder 2, so that the focusing coil 6 and the tracking coils 7 are placed in the magnetic path between the pieces and are thereby excited.

With the above-described construction, a drive voltage is externally supplied to each of the coils, causing the coil bobbin 4 to move along the A and B directions indicated in FIGS. 3(a) and 3(b). Consequently, the objective lens 11 mounted to the lens holder 2 is appropriately moved along the focusing and tracking directions.

The mounting of the above-described coil bobbin 4 to the lens holder 2 is achieved by applying the adhesive 3 to an end wall 12 of the lens holder 2, pushing a flange 13 of the bobbin 4 having wound thereon the tracking coils 7 against the adhesive 3 so that they are brought close together, and allowing the adhesive 3 to dry, thus resulting in bonding.

The biaxial actuator with the above-described construction has a number of problems. For example, when the adhesive 3 is applied to the lens holder 2, and the coil bobbin 4 is pushed against the holder 2 with the adhesive 3, extra adhesive 14 is forced out from the bonded faces. The extra adhesive 14 results in bonding of the coil bobbin 4 to the yoke 9, or a substantially smaller distance between the lower face of the coil bobbin 4 and the yoke 9. Thus, the extra adhesive 14 tends to interfere with the movement of the lens holder 2 in a focusing direction.

Since the bonded faces are brought very close together, the required curing time for the adhesives is increased, leading to poor production efficiency.

SUMMARY OF THE INVENTION

An object of the present invention is to solve the problems associated with the aforementioned conventional optical pickup assembly.

More particularly, the present invention has an object of providing an objective lens drive device in which the extra adhesive is not forced out from the bonded faces of the lens holder and the coil bobbin, and an adhesive with a short curing time can be used.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The above-mentioned objects, according to the present invention, are achieved by an objective lens drive device comprising a lens holder for holding an objective lens, a coil bobbin wound with a focusing coil and at least one tracking coil, a bobbin holder for holding the coil bobbin, the bobbin holder being fixed to the lens holder, and a plurality of elastic supporting members for movably supporting the lens holder for movement in a direction parallel to the optical axis of the objective lens and in a direction perpendicular to the optical axis of the objective lens, each elastic supporting member having one end fixed to the lens holder and another end fixed to a fixed member. At least one space is provided for filling with adhesives to fasten the coil bobbin into the bobbin holder, which space is formed by portions of the bobbin holder, portions of the lens holder, and portions of the coil bobbin.

In a preferred embodiment of the objective lens drive device, the space for filling with adhesives is formed by erected portions provided integrally with the bobbin holder, a bottom plate portion provided integrally with the bobbin holder, and side walls of the lens holder. The adhesive is preferably a photo-setting type adhesive.

According to another aspect of the present invention, the objects of the invention are achieved with an objective lens drive device, comprising a lens holder for holding an objective lens, a coil bobbin wound with a focusing coil and at least one tracking coil, a bobbin holder for holding the coil bobbin, the bobbin holder being fixed to the lens holder, magnet means for generating a magnetic field to the focusing coil and the tracking coil for driving the lens holder with the focusing coil and the tracking coil, the coil bobbin and the bobbin holder having a receiving portion for receiving the magnet means, and a plurality of elastic supporting members for movably supporting the lens holder for movement in a direction parallel to the optical axis of the objective lens and in a direction perpendicular to the optical axis of the objective lens, each elastic supporting member having one end fixed to the lens holder and another end fixed to a fixed member. At least one space is provided for filling with adhesives to fasten the coil bobbin into the bobbin holder, which space is formed by portions of the bobbin holder, portions of the lens holder, and portions of the coil bobbin.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENT

A description of the construction and operational effects of an objective lens drive device according to a preferred embodiment of the present invention will be provided with reference to FIGS. 1, 2(a), 2(b) and 2(c).

Figure 1:
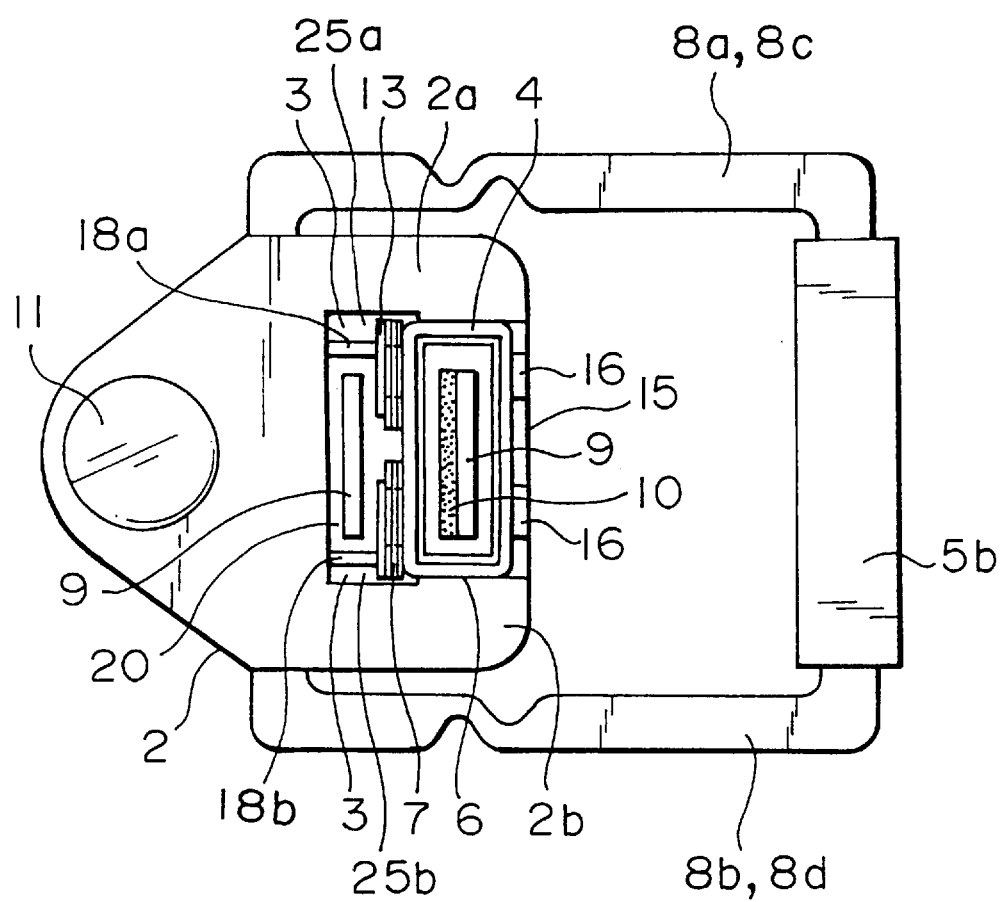
FIG. 1 is a plan view of an objective lens drive device of the present invention.
Figure 2A:
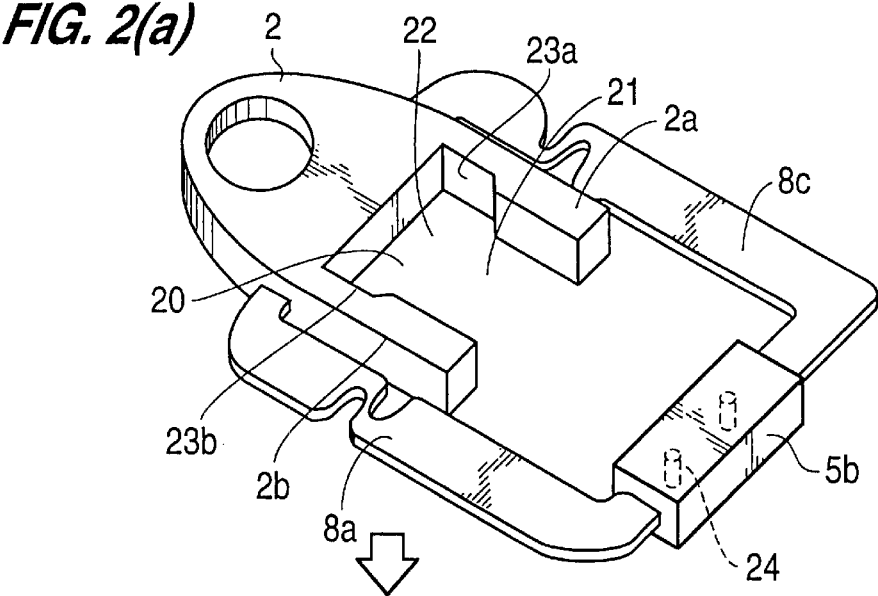
FIGS. 2(a) to 2(c) illustrate the component parts of the objective lens drive device of the present invention with FIG. 2(a) being a perspective view of the lens holder, FIG. 2(b) being a perspective view of the coil bobbin, and FIG. 2(c) being a perspective view of the bobbin holder.
Figure 2B:
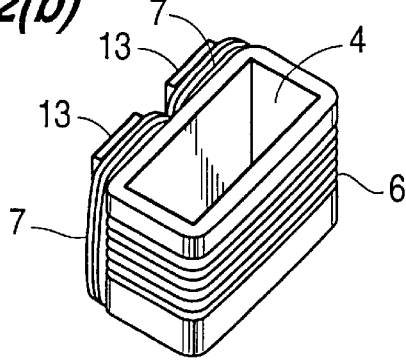
Figure 2C:
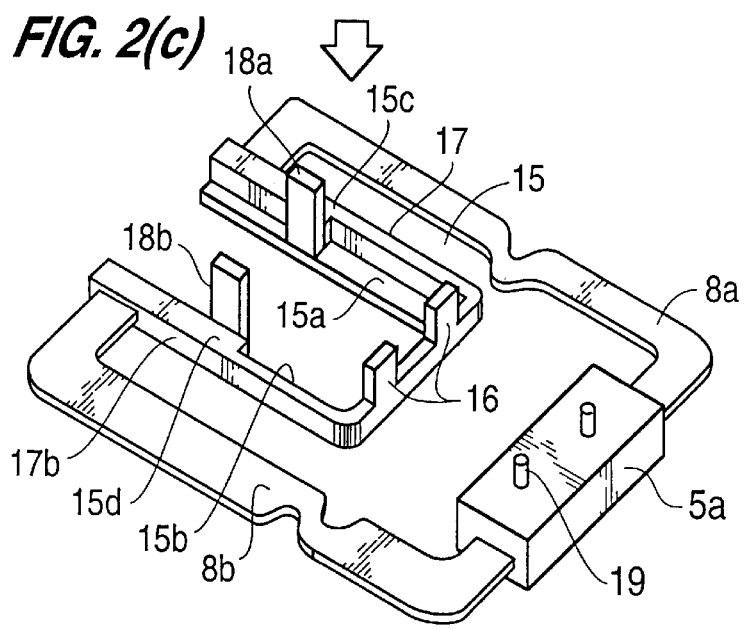

FIG. 1 is a plan view of an objective lens drive device in the form of a biaxial actuator 1 according to a preferred embodiment of the present invention. FIGS. 2(a), 2(b), and 2(c) are perspective views of the component parts to be assembled together that make up the bi-axial actuator 1.

A bobbin holder 15, as shown in FIG. 2(c), is a C-shaped molded product. The holder 15 is provided with tabs 16 for holding the back portion of the coil bobbin, and tabular erected portions 18a, 18b extending upward above a pair of side portions 17a, 17b. A bottom plate 15a and a bottom plate portion 15c are provided at the inner side of the bobbin holder 15.

One end of each spring leaf 8a, 8b is mounted, respectively, to the side portions 17a, 17b, and the other end of each leaf spring 8a, 8b is mounted to a molded mounting section 5a. Pins 19 are mounted on the upper face of the mounting section 5a.

The lens holder 2 of FIG. 2(a) has a pair of side walls 2a, 2b, and a C-shaped cutout at the center thereof. The C-shaped cutout 20 includes a bobbin receiving section 21 and a yoke insertion section 22 adjacent to the receiving section 21. Steps 23a, 23b are formed at both sides of the yoke insertion section 22.

One end of each leaf spring 8c, 8d is mounted, respectively, to the outer sides of the lens holder 2, and the other end of each leaf spring 8c, 8d is mounted to the mounting section 5b. Pin receiving holes 24 are formed in the lower portion of the mounting section 5b.

Figure 3A:
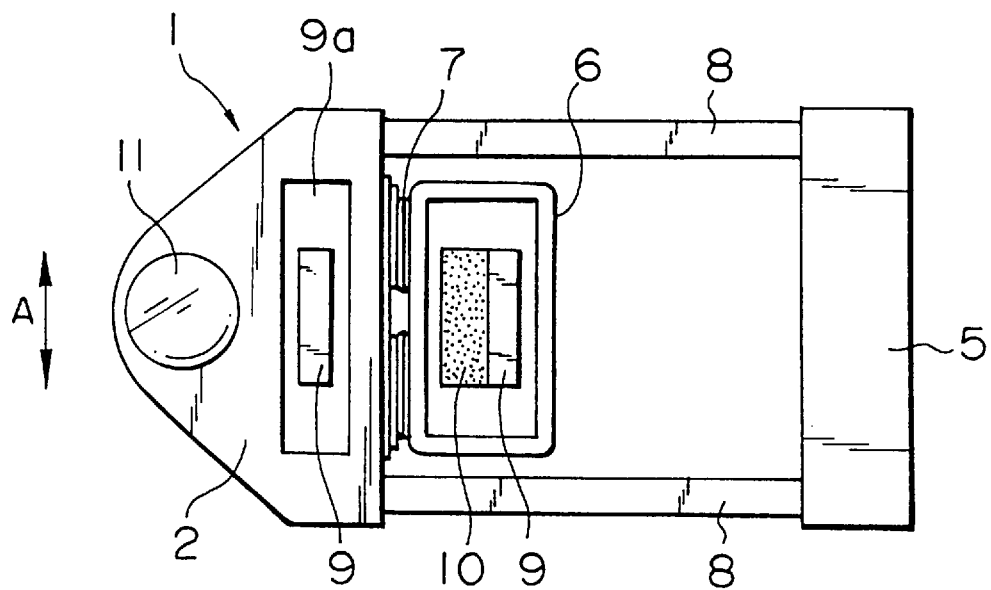
FIGS. 3(a) and 3(b) are a plan view and a side view, respectively, of a conventional biaxial actuator for an objective lens.
Figure 3B:
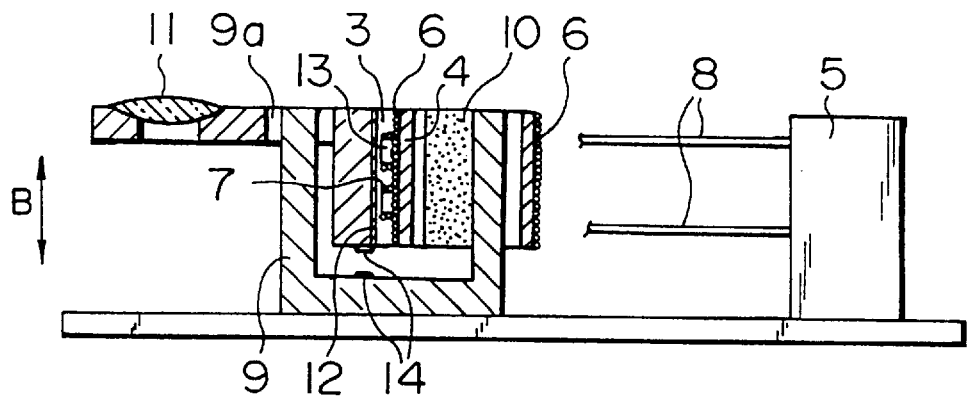

The coil bobbin 4 of FIG. 2(b) has a similar structure to that of the conventional coil bobbin shown in FIGS. 3(a) and 3(b). The coil bobbin 4 is rectangular in cross section, with a focusing coil 6 wound around the periphery thereof, and a pair of tracking coils 7 wound around one side thereof.

The order of assembly is as follows. First, the tracking coil 7 side of the coil bobbin 4 is brought into contact with the erected portions 18a, 18b, and the back face of the coil bobbin 4 is brought into contact with the tabs 16. Then, the lower face of the bobbin holder 15 is placed such that it contacts the bottom plates 15a, 15b.

Thereafter, the lens holder 2 is placed over the coil bobbin 4. While this is being done, the front ends of the erected portions 18a, 18b come into contact with the inner walls of the cutout 20 and are inserted into the cutout 20 so as to cover the steps 23a, 23b. The two side walls of the coil bobbin 4 are mounted such that they are interposed between side walls 2a, 2b of the lens holder 2. The pins 19 on the mounting section 5a connected to the leaf springs 8a, 8b are fitted into the hole receiving holes 24 of the mounting section 5b, thus connecting both mounting sections.

As illustrated in FIG. 1, the completed biaxial actuator 1 is an integrally formed assembly of the bobbin holder 15, the coil bobbin 4, and the lens holder 2.

In the present embodiment, the erected portions 18a, 18b and the bottom plate portion 15c integrally provided with the bobbin holder 15, the steps 23a, 23b of the lens holder, and the flanges 13 (tracking coils 7) of the bobbin 4 together form empty chambers 25a, 25b. When the empty chambers 25a, 25b are filled with adhesives 3, the adhesives 3 are blocked, respectively, by the five walls formed by the above-described component parts, thus preventing extra adhesive 3 from being forced out.

The bonding is completed within a short time by placing adhesives of the photo-setting type into the empty chambers 25a, 25b and irradiating ultraviolet light from the open ends of the empty chambers 25a, 25b. The adhesive can be automatically dispensed with an adhesive dispenser or the like. The adhesive can be cured by irradiating ultraviolet light from the upper open ends of the empty chambers 25a, 25b, which is completed in a short time.

As is apparent from the foregoing description, the present invention makes it possible to bond the lens holder 2, and the coil bobbin 4, with no adhesive being forced out, so that fewer defective biaxial actuators are produced. In addition, photo-setting type resin can be used as the adhesive so that a biaxial actuator with high production efficiency can be produced.

It will be appreciated that the present invention is not limited to the exact construction that has been described above and illustrated in the accompanying drawings, and that various modifications and changes can be made without departing from the spirit and scope of the present invention. It is intended that the scope of the invention only be limited by the appended claims.

What is claimed is:

1. An objective lens drive device comprising:
   a lens holder for holding an objective lens;
   a coil bobbin wound with a focusing coil and at least one tracking coil;
   a bobbin holder for holding said coil bobbin, said bobbin holder being fixed to said lens holder;
   a plurality of elastic supporting members for movably supporting said lens holder for movement in a direction parallel to an optical axis of said objective lens and in a direction perpendicular to the optical axis of said objective lens, each elastic supporting member having one end fixed to said lens holder and another end fixed to a fixed member;
   at least one chamber for filling with adhesives to fasten said coil bobbin to said bobbin holder, which chamber is formed by said bobbin holder, said lens holder, and said coil bobbin, wherein said chamber is formed by tabular erected portions provided integrally with said bobbin holder, a bottom plate portion provided integrally with said bobbin holder, and side walls of said lens holder, whereupon the lens holder and the coil bobbin are bonded without forcing out adhesive from said chamber.

2. An objective lens drive device according to claim 1, wherein said space is formed by erected portions provided integrally with said bobbin holder, a bottom plate portion provided integrally with said bobbin holder, and side walls of said lens holder.

3. An objective lens drive device according to claim 1, wherein said adhesive is a photo-setting type adhesive.

4. An objective lens drive device as set forth in claim 1, wherein a second chamber like said one chamber is provided for filling with adhesives.

5. An objective lens drive device comprising:

a lens holder for holding an objective lens;

a coil bobbin wound with a focusing coil and at least one tracking coil;

a bobbin holder for holding said coil bobbin, and said bobbin holder being fixed to said lens holder;

magnet means for generating a magnetic field to said focusing coil and said at least one tracking coil for driving said lens holder with said focusing coil and said at least one tracking coil, said coil bobbin and said bobbin holder having a receiving portion for receiving said magnet means;

a plurality of elastic supporting members for movably supporting said lens holder for movement in a direction parallel to an optical axis of said objective lens and in a direction perpendicular to the optical axis of said objective lens, each elastic supporting member having one end fixed to said lens holder and another end fixed to a fixed member;

at least one chamber for filling with adhesives to fasten said coil bobbin to said bobbin holder, which chamber is formed by said bobbin holder, said lens holder, said coil bobbin, tabular erected portions provided integrally with said bobbin holder, a bottom plate portion provided integrally with said bobbin holder, and side walls of said lens holder.

6. An objective lens drive device according to claim 5, wherein said space is formed by erected portions provided integrally with said bobbin holder, a bottom plate portion provided integrally with said bobbin holder, and side walls of said lens holder.

7. An objective lens drive device according to claim 5, wherein said adhesive is a photo-setting type adhesive.

8. An objective lens drive device as set forth in claim 7, wherein a second chamber like said one chamber is provided for filling with adhesives.

9. An objective lens drive device comprising:

a lens holder for holding an objective lens; a coil bobbin wound with a focusing coil and at least one tracking coil;

a bobbin holder for holding said coil bobbin, said bobbin holder being fixed to said lens holder;

a plurality of elastic supporting members for movably supporting said lens holder for movement in a direction parallel to an optical axis of said objective lens and in a direction perpendicular to the optical axis of said objective lens, each elastic supporting member having one end fixed to said lens holder and another end fixed to a fixed member; and means, including at least one chamber, for filling with adhesives to fasten said coil bobbin to said bobbin holder, which chamber is formed by said bobbin holder, said lens holder, said coil bobbin, erected tabular portions provided integrally with said bobbin, a bottom plate portion provided integrally with said bobbin holder, and side walls of said lens holder, whereupon adhesives in said chamber are blocked against leakage.

10. An objective lens drive device according to claim 9, wherein said adhesive is a photo-setting type adhesive.

11. An objective lens drive device according to claim 9, further comprising:

magnet means for generating a magnetic field to said focusing coil and said at least one tracking coil for driving said lens holder with said focusing coil and said at least one tracking coil, said coil bobbin and said bobbin holder having a receiving portion for receiving said magnet means.

\* \* \* \* \*